(12) United States Patent
Barron et al.

(10) Patent No.: US 7,685,475 B2
(45) Date of Patent: Mar. 23, 2010

(54) SYSTEM AND METHOD FOR PROVIDING PERFORMANCE STATISTICS FOR APPLICATION COMPONENTS

(75) Inventors: Gilbert Barron, South Salem, NY (US); John E. T. Brann, Hartsdale, NY (US)

(73) Assignee: Morgan Stanley Smith Barney Holdings LLC, Purchase, NY (US)

( * ) Notice: Subject to any disclaimer, the term of this patent is extended or adjusted under 35 U.S.C. 154(b) by 321 days.

(21) Appl. No.: 11/651,380

(22) Filed: Jan. 9, 2007

(65) Prior Publication Data
US 2008/0168044 A1      Jul. 10, 2008

(51) Int. Cl.
*G06F 11/00*      (2006.01)
(52) U.S. Cl. ........................................................ 714/47
(58) Field of Classification Search .................. 714/47, 714/48; 702/186
See application file for complete search history.

(56) References Cited

U.S. PATENT DOCUMENTS

| | | | | |
|---|---|---|---|---|
| 5,748,881 A | * | 5/1998 | Lewis et al. | .................... 714/47 |
| 5,819,066 A | * | 10/1998 | Bromberg et al. | ........... 707/102 |
| 5,872,976 A | * | 2/1999 | Yee et al. | ..................... 717/127 |
| 6,108,800 A | * | 8/2000 | Asawa | .......................... 714/47 |
| 6,467,052 B1 | * | 10/2002 | Kaler et al. | .................... 714/39 |
| 6,691,067 B1 | * | 2/2004 | Ding et al. | ................... 702/186 |
| 6,901,582 B1 | | 5/2005 | Harrison | |
| 7,062,540 B2 | | 6/2006 | Reddy et al. | |
| 7,082,463 B1 | * | 7/2006 | Bradley et al. | .............. 709/223 |
| 7,120,689 B2 | * | 10/2006 | Gonsalves et al. | .......... 709/224 |
| 7,134,054 B2 | | 11/2006 | Oshima et al. | |
| 7,222,269 B2 | * | 5/2007 | Kurinami et al. | .............. 714/47 |
| 2003/0084018 A1 | | 5/2003 | Chintalapati et al. | |
| 2003/0110007 A1 | * | 6/2003 | McGee et al. | ............... 702/179 |

(Continued)

OTHER PUBLICATIONS

"No More False Alerts: Implementing a Successful Application Management Strategy," Mercury Interactive Corporation, 2005.

(Continued)

*Primary Examiner*—Robert Beausoliel
*Assistant Examiner*—Elmira Mehrmanesh
(74) *Attorney, Agent, or Firm*—K&L Gates LLP

(57) ABSTRACT

An application monitoring method and system. The method may comprise the steps of capturing raw performance data from one or more components of the application, converting the raw performance data of the one or more components to data records having a standard event data format, determining summary data for the one or more components based on the data records, and presenting the summary data to an end user.

15 Claims, 5 Drawing Sheets

U.S. PATENT DOCUMENTS

| | | | |
|---|---|---|---|
| 2003/0126003 A1 | 7/2003 | vom Scheidt et al. | |
| 2003/0204588 A1* | 10/2003 | Peebles et al. | 709/224 |
| 2004/0068560 A1 | 4/2004 | Oulu et al. | |
| 2004/0098478 A1* | 5/2004 | Koetke et al. | 709/224 |
| 2004/0148383 A1* | 7/2004 | Gonsalves et al. | 709/224 |
| 2005/0021736 A1 | 1/2005 | Carusi et al. | |
| 2005/0138111 A1 | 6/2005 | Aton et al. | |
| 2005/0246241 A1 | 11/2005 | Irizarry, Jr. et al. | |
| 2005/0262136 A1 | 11/2005 | Lloyd et al. | |
| 2005/0278703 A1 | 12/2005 | Lo et al. | |
| 2006/0020924 A1 | 1/2006 | Lo et al. | |
| 2006/0048017 A1 | 3/2006 | Anerousis et al. | |
| 2006/0085542 A1 | 4/2006 | Fu et al. | |
| 2006/0143231 A1 | 6/2006 | Boccasam et al. | |
| 2006/0179432 A1 | 8/2006 | Walinga et al. | |
| 2006/0218267 A1 | 9/2006 | Khan et al. | |
| 2006/0253745 A1 | 11/2006 | Maso et al. | |

OTHER PUBLICATIONS

"The Top 10 Misconceptions About Performance and Availability Monitoring," Mercury Interactive Corporation, 2005.

"Web Services: A New Era Dawns For System Monitoring," Mercury Interactive Corporation, 2005.

"Agentless Monitoring: Reducing The Total Cost of Ownership (TCO) of System Monitoring," Mercury Interactive Corporation, 2005.

* cited by examiner

| Get Approvers Activity Current Status | | | Detail View | Last Event Thurs 12/6/2006 4:47:20 PM | 12/6/2006 4:48:30 PM | |
|---|---|---|---|---|---|---|
| Sample Size | Load (evt/sec) | Success Latency (ms) | Fail Latency (ms) | Success % | SLC Load % | SLC Latency (%) |
| Short (10) | 0.020 | 1568.700 | 0.000 | 100.00% | 0.20% | 39.22% |
| Medium (100) | 0.056 | 1415.960 | 0.000 | 100.00% | 0.56% | 35.40% |
| Long (500) | 0.107 | 1543.360 | 0.000 | 100.00% | 1.07% | 38.58% |

Dependency Status:

4. Get Approvers Detail

*FIG. 4*

SYSTEM AND METHOD FOR PROVIDING PERFORMANCE STATISTICS FOR APPLICATION COMPONENTS

BACKGROUND

In the fields of computer software and networks, an application is a program or group of programs that performs specific tasks. Application monitoring is a known process of monitoring performance characteristics of an application in order that an application administrator or manager can detect and respond to problems with the application, ideally before the problems affect an end user of the application. It is known, for example, to monitor CPU utilization, throughput, memory usage and the like. Monitoring these metrics, however, is not always sufficient to effectively anticipate production problems with an application.

A component is a reusable program building block that can be combined with other components in the same or other computers in a distributed network to form an application. Components can be deployed on different servers in a network and communicate with each other for needed services.

SUMMARY

In one general aspect, the present invention is directed to systems and methods for monitoring applications. The applications may comprise numerous components that provide services for the application. According to various embodiments, the method may comprise the step of capturing raw performance data from components of an application. The raw performance data from the different components may then be converted to data records having a standard event data format, which may comprise the following data: a time stamp for a transaction performed (or invoked) by the component; a component ID; an indication of whether the transaction was a success; and a latency value. Summary data for the different components may then be computed based on the data records. The summary data may comprise, for example, rolling latency averages, loads, and success percentages for transactions executed or invoked by the components. Then the summary data may be presented to an end user using a web dashboard, for example. End users can maneuver between the various components of an application to view the summary data for the various components. End users may also be able to navigate the components in a hierarchical fashion. In this way, real (or near real) time performance data can be presented to an end user to provide meaningful application service level values. This information may be valuable to an end user in managing the applications.

Other aspects of the present invention are related to systems for monitoring applications.

FIGURES

Various embodiments of the present invention are described herein by way of example in conjunction with the following figures wherein:

FIGS. 3-5 are screen shots of exemplary dashboards for presenting component performance data according to various embodiments of the present invention.

DETAILED DESCRIPTION

The present invention is directed generally to systems and methods of providing real (or near real) time performance statistics for applications and their corresponding components. For purposes of the description to follow, an application may be considered to comprise numerous components that perform services required to provide the desired functionalities of the application. Examples of services that components may provide include making calls to a database, communicating with a mainframe, accessing or processing data, etc. As part of their activities, components may invoke one or more other components.

Figure 1:
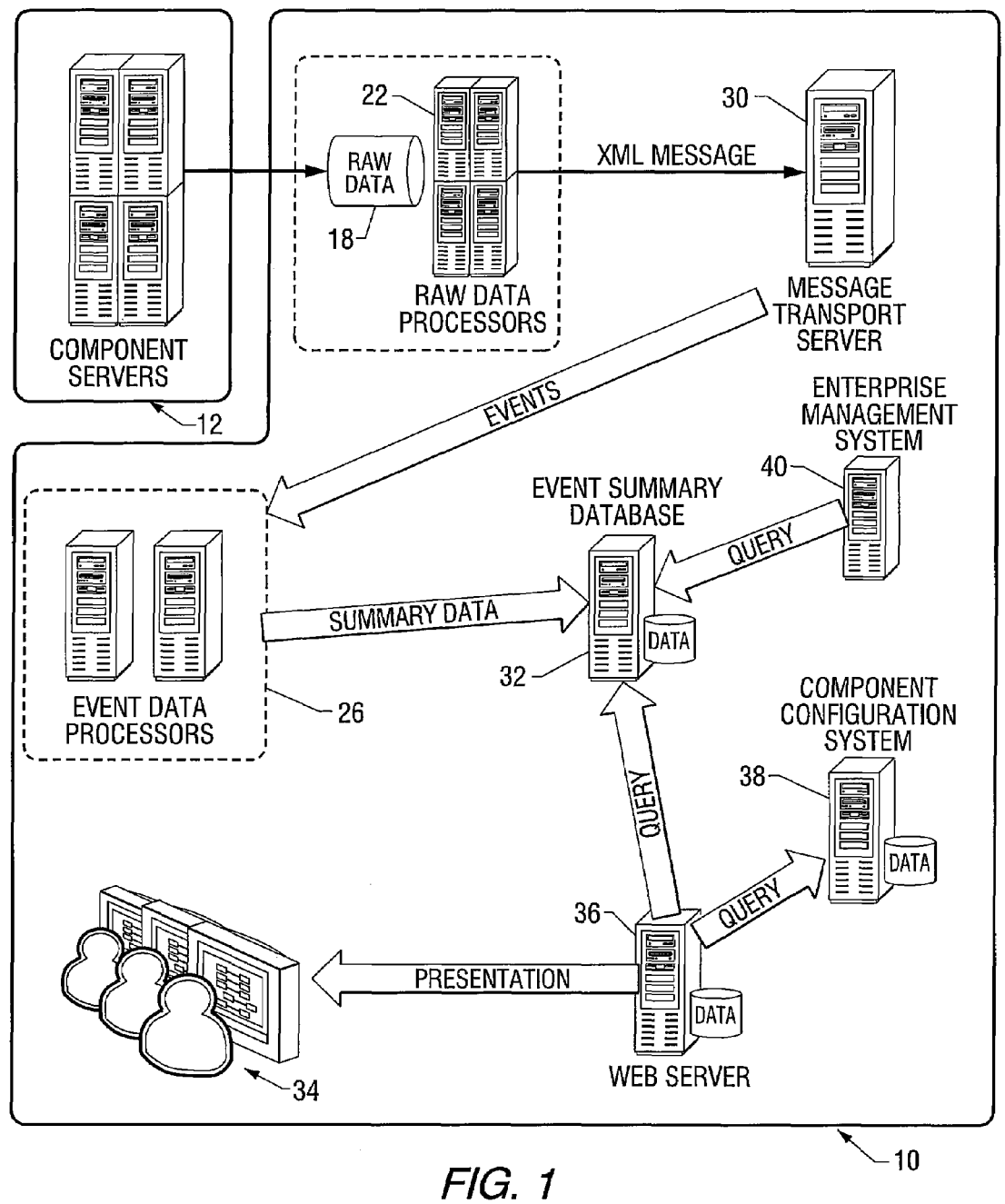
FIG. 1 is a diagram of an application monitoring system according to various embodiments of the present invention.
Figure 2:
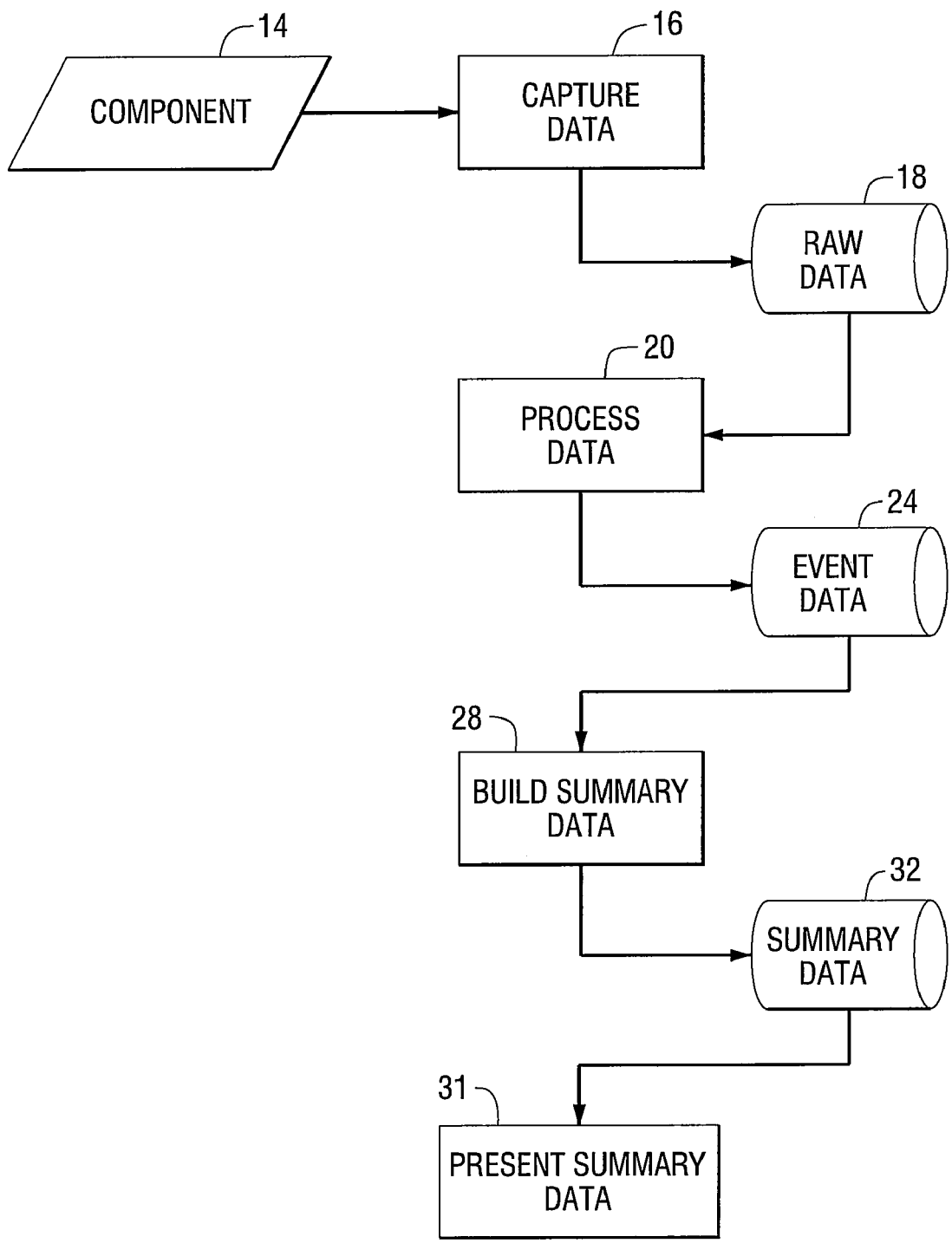
FIG. 2 is a flowchart illustrating a process for monitoring the performance of a component of an application according to various embodiments of the present invention.

One embodiment of the present invention is described below in conjunction with FIGS. 1 and 2, where FIG. 1 is a diagram of system 10 for monitoring the components of an application and FIG. 2 is a diagram of a process for monitoring the components according to various embodiments of the present invention. As shown in FIG. 1, the system 10 may collect data from a number of component servers 12 for performing the various services of the application. Each component may perform one or more services of the application. As shown in flowchart of FIG. 2, the raw data from a particular component 14 required to analyze the performance of the application may be captured by the component 14 at process step 16 and stored in a raw data store 18. The raw data may include, for each transaction (or event) of the component 14: the time; the latency; and an indication of whether the event was a success or failure. Latency is a measure of how long it took the component 14 to perform the transaction. The raw data may be stored and made accessible by the component 14 in the raw data store 18 in the format provided by the component 14. For example, the raw data store 18 may be in memory, a database, a log file, or some other application specific store depending on the format of the raw data provided by the component 14.

As shown in FIG. 2, at process step 20, the raw data is read from the raw data store 18 in order to process the raw data. The raw data processors 22 (see FIG. 1) may process the raw performance data by converting the raw data from the component 14 into a standardized event data format. According to one embodiment, the component event data format may be as follows:

<timestamp><component_id><success/fail><latency>

In such an embodiment, the component event data format provides the time stamp for when the transaction or event was invoked, an identification of the component 14, whether the transaction succeeded or not, and the latency.

The raw data processors 22 are preferably adapted to process the format of the raw data provided by the component 14. For example, if some of the raw data provided by the components of the application are log files, the raw data processors 22 may comprise log parsers for processing the raw data. Similarly, if some of the raw data provided by the components are stored in a database, the raw data processors 22 may comprise database parsers. If some of the raw data provided by the components are stored as mainframe events, the raw data processors 22 may comprise a mainframe parser, and so on. Preferably, all of the raw data processors 22 output the event data in the common data format.

The event data 24 from the raw data processors 22 in the common data format may be sent to one or more event data processors 26 for, at process step 28 (see FIG. 2), building summary data regarding the performance of the components. According to various embodiments as shown in FIG. 1, the raw data processors 22 may send the component event data (in the component event data format) in XML messages to a message transport server 30, which may transport the event data messages to the event data processors 26. The event data processors 26 may convert the event data to summary data. For example, for each component of the application, the event data processors 26 may calculate rolling small, medium and large average latency values. For example, the event data processors 26 may calculate the average latency for the last ten events (a small average latency), one hundred events (a medium average latency), and five hundred events (a large average latency). Of course, in other embodiments, a different number of events could be used for the different average latency calculations.

The event data processors 26 may also calculate the success rate percentage of the different components. That is, for example, the event data processors 26 may calculate the percentage of events that represent success for the component in executing its transactions. In addition, the event data processors 26 may calculate the load for the components. The load represents the number of transactions performed by a component 14 in a given time period (e.g., one second). The event data processors 26 may calculate the load based on the time stamp data provided in the component event data format. Averages may be calculated over different sample sizes. For example, a small or short sample size would represent the average of the most recent events and a long or large sample size would represent the average of all the events stored in the event data processors 26. Trends based on when the events were received can be derived from averages of the different sample sizes.

The event summary data may be used by the event data processors 26 to calculate the service level capacity (SLC) of the service. The SLC of an application component 14 may be the maximum load under which a certain percentage (e.g., 95%) of transactions (or invocations) is serviced at or under the maximum acceptable latency. In the example of FIG. 4A (described further below), the table 70a shows SLC data for a component that has a short SLC latency percentage of 39.22%, indicating that the average latency of last ten events were serviced in 39.22% of maximum acceptable latency in this example. Medium and long SLC latency percentages could also be calculated.

The details of components and services may be stored in a component configuration database 38. For example, the configuration database 38 may be used to store threshold values for each component 14 and service and summary information about components and services. The relationship of components to other components to describe the dependencies between components 14 can also be stored in the configuration database 38.

The event summary data calculated by the event data processors 26 may be stored in an event summary database 32. According to various embodiments, the summary data stored in the event summary database 32 may be presented to end users 34 using a web-based dashboard at step 31 (see FIG. 2). As shown in the exemplary dashboard screen shots of FIGS. 3-5 (described further below), an end user 34 may select a component to view its performance data. A web server 36 may query the event summary database 32 (e.g., using a SQL query) to retrieve the requested data and then present the requested data to the end user 34 in a dashboard using, for example, a .NET 2.0. framework. As shown in FIG. 1, the web server 36 may also query a component configuration database 38 for data regarding the configuration of the components 14 of the application if needed.

Event summary data from the event summary database 32 may be used to identify fault conditions within the applications. For example, an enterprise management system 40 may query the event summary database 32 for event summary data as needed. This data could be used to trigger operation interaction to remedy the fault condition.

Figure 3:
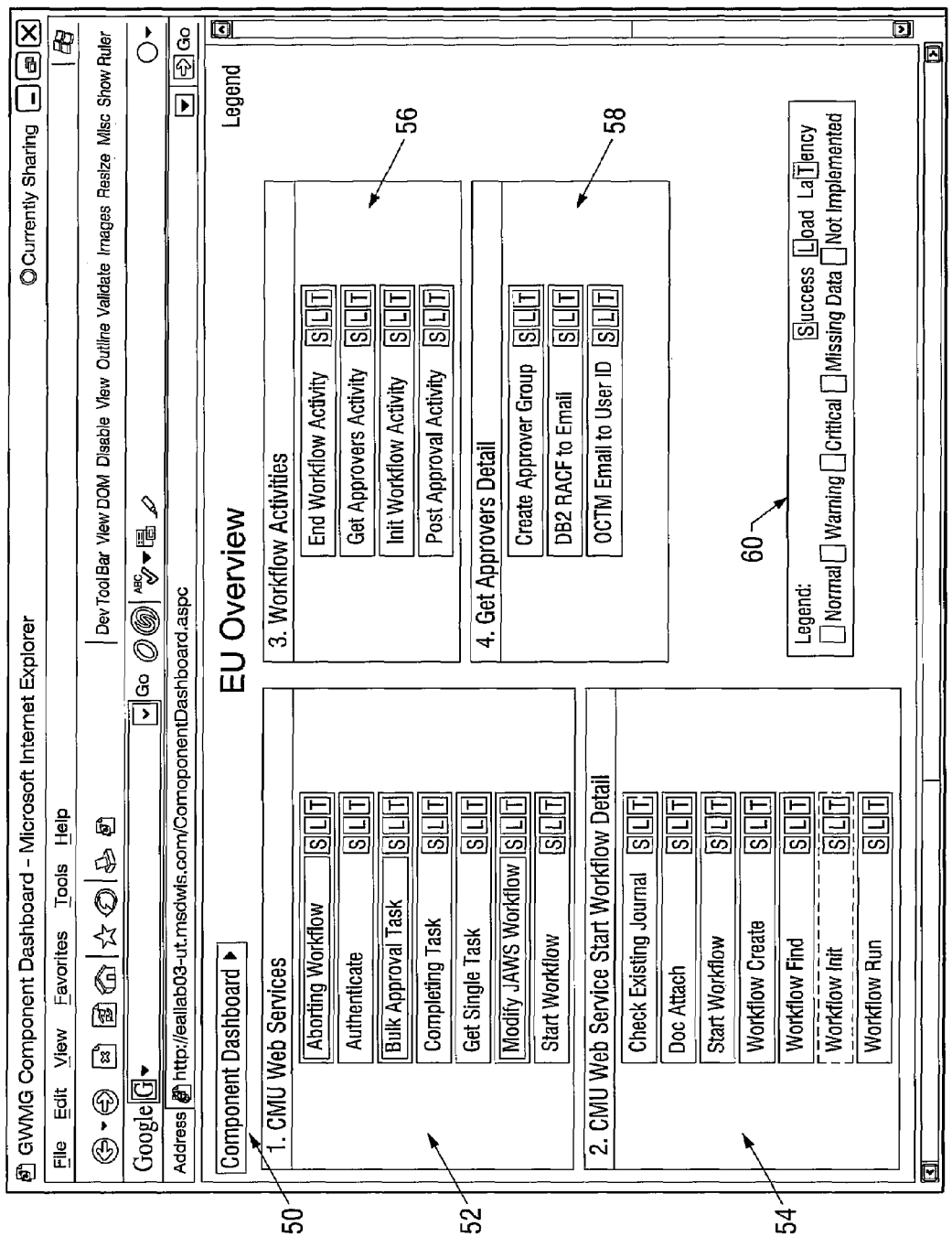
Figure 5:
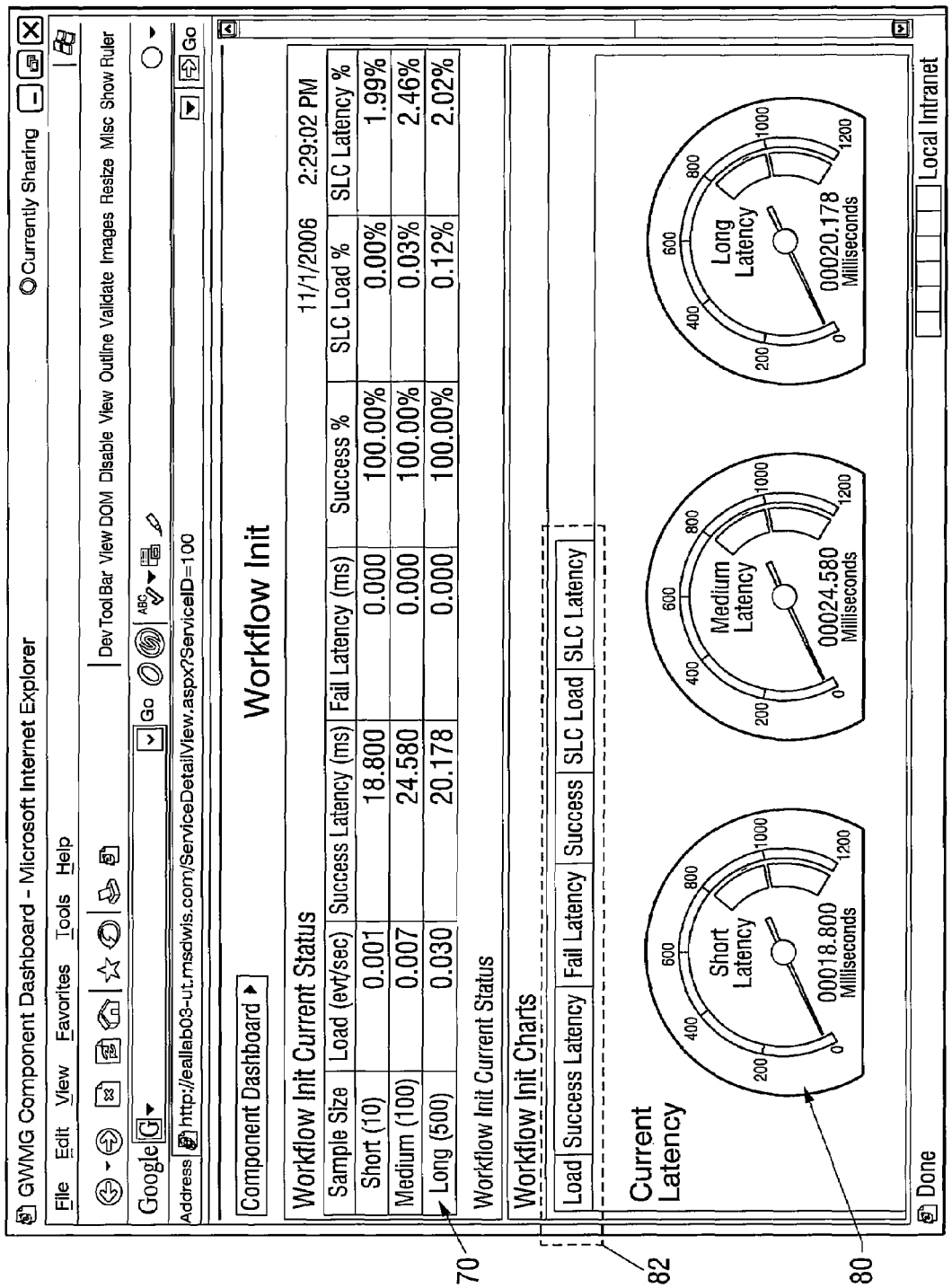

FIGS. 3-5 are exemplary dashboard screen shots that may be provided by the web server 36 to the end users 34. In the illustrated example, the end user 34 may select the desired application for which to review the performance characteristics of its components in a drop down window 50. The various components of the selected application may then be displayed in groups based on, for example, the types of services provided by the components. In the illustrated embodiment, the components of the selected application are grouped into four groups: CMU web services (in field 52); CMU web service start workflow detail (in field 54); workflow activities (in field 56); and get approvers detail (in field 58). In the illustrated example, each metric may be represented by a colored icon that represents the current status. Success is represented by [S], load is represented by [L], and Latency is represented by [T]. As such, as indicated in the legend 60, different color codes may be used to identify for the end user of the current status of the various components in terms of success, load, and latency.

The dashboard may also include a table 70 showing various performance characteristics for a chosen component. In the example of FIG. 5, the "Workflow Init" service is selected (in the CMU web service start workflow detail component 54). The table 70 may provide the rolling short, medium and large latency averages and percentages for various performance characteristics computed by the event data processors 26 including, for example: load (in events/sec); success latency (in ms); failure latency (in ms); success percentage; load percentage; and latency percentage. The table 70 may also display other information, such as a service level capacity (SLC) load percentage and a SLC latency percentage.

As shown in FIG. 5, the dashboard may also include additional graphical representations for the performance characteristics, such as analog dials 80 that graphically display various performance characteristics. In the example of FIG. 5, the dashboard includes three meters 80, one for short latency, the second for medium latency, and the third for long latency. Also, the end user 34 could select to view other meters for other performance-related parameters by selecting the desired tab in the menu field 82. Of course, in other embodiments, the dashboard may use other graphics and/or present other performance characteristics.

The application monitoring system 10 may monitor one or more of the components of an application. Ideally, the system 10 monitors all of the components of an application. According to various embodiments, an enterprise could scale the system 10 to monitor more than one application. The dashboards may be designed and optimized for the different applications. For example, the applications may not have (and likely will not have) the same components. The dashboards may be configured for the respective applications, such as having different groupings of the components for different applications and/or the display of different performance characteristics or metrics.

As shown in the example table 70 of FIG. 4, the application monitoring system may present dependencies between components and services as links 70b on the monitor screen. For example, the application may be configured to allow users to see any component or service that another component requires to complete its tasks. The link between components and services gives the user the ability to traverse the hierarchy of components. That is, the end user card activate the link 70b to be presented with status data regarding a component(s) is dependent or depend on the current component.

The end users 34 may be application owners or other interested persons. By presenting real-time rolling averages of the various performance characteristics of the components, the end users 34 can determine if certain services are taking too long to perform, for example. Armed with such information, the end users 34 may take appropriate remedial action if necessary to ameliorate potential problems.

While several embodiments of the invention have been described, it should be apparent, however, that various modifications, alterations and adaptations to those embodiments may occur to persons skilled in the art with the attainment of some or all of the advantages of the invention. For example, the steps of the processes described above may be performed in different or alternative orders in various embodiments, or certain steps could be combined. It is therefore intended to cover all such modifications, alterations and adaptations without departing from the scope and spirit of the present invention as defined by the appended claims.

What is claimed is:

1. A computer-implemented application monitoring method comprising:
    capturing raw performance data from one or more components of an application by at least one processor, wherein each of the one or more components of the application performs at least one service required to provide a functionality of the application;
    converting the raw performance data of the one or more components to data records having a standard event data format by the at least one processor;
    determining summary data for the one or more components by the at least one processor based on the data records, wherein the summary data comprises:
        for each of the one or more components, a small sample size latency average, wherein the small sample size latency average is an average latency over a first number of the most recently executed instances of the component;
        for each of the one or more components, a medium sample size latency average, wherein the medium sample size latency average is an average latency over a second number of the most recently executed instances of the component, wherein the second number is larger than the first number; and
        for each of the one or more components, a large sample size latency average, wherein the large sample size latency average is an average latency over a third number of the most recently executed instances of the component, wherein the third number is larger than the second number; and
    presenting to the end user by a server a user interface displaying a first portion of the summary data describing a first component selected from the one or more components and a link that, when activated by the end user causes the user interface to display a second portion of the summary data describing a second component selected from the one or more components, wherein the first component is dependent on the second component such that the first component requires the second component in order for the first component to complete its at least one service.

2. The method of claim 1, wherein the step of determining summary data further comprises determining a load for the one or more components.

3. The method of claim 2, wherein the step of determining summary data further comprises determining a success percentage for the one or more components.

4. The method of claim 3, wherein the step of presenting the summary data to the end user comprises presenting the small sample size latency average, the medium sample size latency average, the large sample size latency average, the load and the success percentage for at least one of the one or more components when requested by the end user.

5. The method of claim 4, wherein the step of determining summary data further comprises determining a service level capacity (SLC) latency percentage for the one or more components, and wherein the step of presenting the summary data further comprises presenting the SLC latency percentage data when requested by the user.

6. The method of claim 1, wherein the step of presenting the summary data comprises presenting the summary data to the end user using a web dashboard.

7. The method of claim 1, wherein the data records having the standard event data format comprise the following data: a time stamp for a transaction performed by a component; a component ID; an indication of whether the transaction was a success; and a latency value.

8. A computer-implemented application monitoring method comprising:
    capturing raw performance data from one or more components of an application by at least one processor, wherein each of the one or more components of the application performs at least one service required to provide a functionality of the application;
    converting the raw performance data of the one or more components to data records having a standard event data format by the at least one processor, wherein the data records comprise the following data:
        a time stamp for a transaction performed by a component;
        a component ID;
        an indication of whether the transaction was a success; and
        a latency value for the transaction;
    determining summary data by the at least one processor for the one or more components based on the data records, wherein the summary data comprises for each of the one or more components a small sample latency average, a medium sample latency average, a large sample latency average, a load, and a success percentage, wherein the small sample size latency average is an average latency over a first number of the most recently executed instances of the component, the medium sample size latency average is an average latency over a second number of the most recently executed instances of the component, and the large sample size latency average is an average latency over a third number of the most recently executed instances of the component, wherein the second number is larger than the first number and the third number is larger than the second number; and
    presenting the summary data to an end user as a web dashboard using a server, wherein the web dashboard displays a first portion of summary data describing a first component selected from the one or more components and a link that, when activated by the end user causes the web dashboard to display a second portion of the summary data describing a second component selected from the one or more components, wherein the first component is dependent on the second component such that the first component requires the second component in order for the first component to complete its at least one service.

9. An application monitoring system comprising:
one or more raw data processors that convert raw performance data from one or more components of an application to data records having a standard event data format;
one or more event data processors that calculate summary data for the one or more components based on the data records, wherein the summary data comprises:
  for each of the one or more components, a small sample size latency average, wherein the small sample size latency average is an average latency over a first number of the most recently executed instances of the component;
  for each of the one or more components, a medium sample size latency average, wherein the medium sample size latency average is an average latency over a second number of the most recently executed instances of the component, wherein the second number is larger than the first number; and
  for each of the one or more components, a large sample size latency average, wherein the large sample size latency average is an average latency over a third number of the most recently executed instances of the component, wherein the third number is larger than the second number;
an event summary database that stores the summary data calculated by the event data processors; and
a server that presents the summary data stored in the event summary database to an end user as a user interface, wherein the user interface displays a first portion of the summary data describing a first component selected from the one or more components and a link that, when activated by the end user causes the user interface to display a second portion of the summary data describing a second component selected from the one or more components, wherein the first component is dependent on the second component such that the first component requires the second component in order for the first component to complete its at least one service.

10. The system of claim 9, wherein the one or more event data processors calculate a load for the one or more components.

11. The system of claim 10, wherein the one or more event data processors calculate a success percentage for the one or more components.

12. The system of claim 11, wherein the server is for presenting the small sample size latency average, the medium sample size latency average, the large sample size latency average, the load and the success percentage for at least one of the one or more components when requested by the end user.

13. The system of claim 12, wherein:
the one or more event data processors calculate a service level capacity (SLC) latency percentage for the one or more components; and
the server presents the SLC latency percentage data to the end user.

14. The system of claim 9, wherein the server is a web server that presents the summary data to the end user in a web dashboard.

15. The system of claim 9, wherein the data records having the standard event data format comprise the following data: a time stamp for a transaction performed by a component; a component ID; an indication of whether the transaction was a success; and a latency value.

* * * * *